United States Patent [19]
Torres et al.

[11] Patent Number: 5,897,635
[45] Date of Patent: *Apr. 27, 1999

[54] SINGLE ACCESS TO COMMON USER/APPLICATION INFORMATION

[75] Inventors: Robert J. Torres, Colleyville; Michael Collins, Keller, both of Tex.

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/474,396

[22] Filed: Jun. 7, 1995

[51] Int. Cl.$^6$ .................................................. G06F 17/30
[52] U.S. Cl. .................... 707/10; 707/104; 395/200.03; 395/701; 711/147
[58] Field of Search ................................ 395/600, 200.3, 395/701; 707/10, 104; 711/147

[56] References Cited

U.S. PATENT DOCUMENTS

| | | | |
|---|---|---|---|
| 4,399,504 | 8/1983 | Obermarck et al. | 364/200 |
| 4,627,019 | 12/1986 | Ng | 364/900 |
| 4,710,870 | 12/1987 | Blackwell et al. | 364/200 |
| 4,799,156 | 1/1989 | Shavit et al. | 364/401 |
| 4,805,134 | 2/1989 | Calo et al. | 364/900 |
| 4,815,030 | 3/1989 | Cross et al. | 364/900 |
| 4,878,175 | 10/1989 | Norden-Paul et al. | 364/413.01 |
| 4,974,151 | 11/1990 | Advani et al. | 364/200 |
| 5,008,853 | 4/1991 | Bly et al. | 364/900 |
| 5,189,606 | 2/1993 | Burns et al. | 364/401 |
| 5,230,048 | 7/1993 | Moy | 395/600 |
| 5,256,863 | 10/1993 | Ferguson et al. | 235/383 |
| 5,305,434 | 4/1994 | Ballard et al. | 395/155 |
| 5,361,358 | 11/1994 | Cox et al. | 395/700 |
| 5,367,686 | 11/1994 | Fisher et al. | 395/700 |
| 5,396,417 | 3/1995 | Burks et al. | 364/401 |
| 5,418,942 | 5/1995 | Krawchuk et al. | 395/600 |
| 5,423,034 | 6/1995 | Cohen-Levy et al. | 395/600 |
| 5,442,788 | 8/1995 | Bier | 395/650 |
| 5,457,797 | 10/1995 | Butterworth et al. | 395/650 |
| 5,504,888 | 4/1996 | Iwamoto et al. | 395/600 |
| 5,551,030 | 8/1996 | Linden et al. | 395/600 |
| 5,564,002 | 10/1996 | Brown | 395/155 |

OTHER PUBLICATIONS

Jim Seymour "Component Softwaare Is Here Now" PC Magazine, pp. 99–100, Jun. 28, 1994.

HG Advani "Adjunct Table for Interdependent Parameters" IBM Technical Disclosure Bulletin, vol. 28, No. 4, pp. 1453, publ. Sep., 1985.

TJ Perry and MR Turner "Tool to Facilitate Testing of Software to Insure Compatibility" IBM Technical Disclosure Bulletin vol. 30, No. 11, pp. 162–165, publ. Apr., 1988.

C Curley "Customization of Application Software using External Data" IBM Technical Disclosure Bulletin, vol. 36, No. 12, pp. 19–20, publ. Dec., 1993.

JW Malcolm, SA Morgan and CA Swearingen "Enabling Multiple Help Files for Dynamic Menu Item Help Support"IBM Technical Disclosure Bulletin, vol. 37, No. 4A, pp. 17–18, publ. Apr. 1994.

"Developing Application With OpenDIS Access Service" Ver 2.0 Metaphor Data Interpretation System, Jan. 1994.

Microsoft "Windows NT Workstation", ver. 3.5 Microsoft Corporation, Jan. 1985.

*Primary Examiner*—Paul R. Lintz
*Assistant Examiner*—Jean M. Corriélus
*Attorney, Agent, or Firm*—A. Bruce Clay

[57] ABSTRACT

The present invention is directed of a method for centralized storage of user and application information where user and application information can be added, deleted, modified, updated, and enhanced to customize user compute environments and to improve overall system administration and oversight. The information is stored in a database file which is interfaced with the user and/or system administrator through a customization user interface (CUI). The CUI includes windowing functionality and allows the user to invoke the method steps for adding, deleting, and updating user information and for adding, deleting, and updating application information.

9 Claims, 9 Drawing Sheets

SINGLE ACCESS TO COMMON USER/APPLICATION INFORMATION

FIELD OF THE INVENTION

The present invention relates generally to a method for administering and coordinating user and application information in a distributed computer environment operating under a window based operating system and, more particularly, to a method for centrally storing routine user and application information so that an administrator can add, update, or delete users and user information, add, delete, or update applications and/or resources by editing a single file through a user customization interface. The address book information (name, place, number, etc.) is integrated with the application information, both in the database and on the CUI. This is a unique feature of the present invention.

More particularly, the present invention relates to a method for centrally storing user and application information in a database where the information is used to tailor, update, expand and administrate user compute environments with the simple addition, deletion, modification, and/or customization of database enter fields and where a user or administrator interacts with the database fields through a customization interface featuring a window display comprising horizontal and vertical tabbed entries identifying users, user profiles, applications, and user compute environment configurations.

BACKGROUND OF THE INVENTION

Prior art search techniques for adding users and/or applications as well as updating user and application information has required the user and/or a system administrator to modify and update user information for each user and for each application. This process can be time consuming and because much of the information is identical, the process is highly repetitive and fraught with the possibility of errors in data entry, updated, and/or user environment customization.

A window management system provides many of the important features of modern user computer interfaces. A window management system allows multiple applications to interact with the user on a single computer display, and provides low level functions for the application to display data and collect input from the user. The window management system permits application programs to show results in different areas of the display, to resize the screen areas in which those applications are executing, to pop-up and to pull-down menus. The window management system is a resource manager in much the same way that an operating system is a resource manager, only the types of screen area to various applications that seek to use the screen and then assists in managing these screen areas so that the applications do not interfere with one another. The window management system also allocates the resources of interaction devices to applications that require a user input and then routes the flow of input information from the devices to the event queue of the appropriate application for which the input is destined.

The look and feel of the user computer interface is determined largely by the collection of interaction techniques provided for it. Designing and implementing interaction techniques for each individual application would be a time consuming and expensive task. Furthermore, each application would end up with a different look and feel making it difficult for a user to move from one application to another. Applications sharing a common window management system can utilize a common interactive technique toolkit built for the window management system to assure a common look and feel. An interactive technique toolkit consists of a set of subroutines that provide different types of display objects.

Interactive technique toolkits, which are subroutine libraries of interaction techniques, are mechanisms for making a collection of techniques available for use by application programs. By using interactive technique toolkits, a consistent look and feel among application programs sharing a common window management system can be insured. Using the same toolkit across all applications is a commonly used approach for providing a look and feel that unifies both multiple applications and the window environment itself. Interactive technique toolkits are available for specific windowing management systems. For instance, the menu style used to select window operations should be the same style used within all applications. Basic elements of the toolkit can include menus, dialog boxes, scroll bars, file selection boxes and the like, all which can be conveniently implemented in windows.

The X Window System is an example of a window management system that can be used in association with the present invention. One of the most important features of this type of window management system is that it supports device independence by separating the interactions with the display, keyboard and mouse from the rest of the system. This type of windowing system has three basic parts: a library of routines at the lowest level; a framework which allows the application developer to combine components from the library to produce a complete user interface; and an interactive toolkit that supports a set of user interface components known as widgets and include such things as scroll bars, menus and buttons.

The architecture of this type of window management system is based on the client-server model. A single process, known as the server, is responsible for all input and output devices. The server creates and manages all windows on the screen, produces text and graphics, and handles input devices such as the keyboard and mouse. The server implementation is independent of any application but is hardware specific. In a typical environment the application is a client and uses the services of the server via a network connection using an asynchronous byte stream protocol. Multiple clients can connect to the same server. The server hides the details of the device-dependent implementation of the server from the clients.

A window manager process allows the user to control the size and location of windows on the screen. These operations are generally performed by a window man, another client application. In this configuration, it is possible for the window manager to get events pertaining to the resizing or moving of windows from the server independent of the notification of these events to the application. The window manager acts independently from the application and, together with the server, may cause the user interface to be modified without the application being involved.

The windows system requires that the application developer be intimately familiar with operation of the windows system including the library, framework, the toolkit, the window manager, and the server. The complexity of the windows system and the expertise required makes user interface development more costly and can result in longer application development cycles using more resources. The complexity of the windows system results in code that is more difficult to write, error prone and difficult to maintain.

It thus would represent a significant advance in the art of distributed computing environments operating a windowing type operating system to have a technique where a single, centralized file contains information about users and applications and the file can be readily, easily, and efficiently modified through a customization user interface to add, delete, and/or update user and application information or to tailor user compute environments.

SUMMARY OF THE INVENTION

The present invention provides a method for centrally storing user and application information and automatically distributing such information to and from the installed applications in a distributed computer environment running a windowing type operating system so that user and application information can be updated, edited, and manipulated through a customization user interface (CUI). The applications are not required to change their current operations. The method includes the step of installing a localized user and application information procedure (LUAIP) comprising a central datafile, a CUI, and methods for manipulating data entries in the datafile. Once installed, the CUI provides a user access to the manipulation methods by pointer-based device or keyboard selection from a series of menus or icons associated with the CUI display window. The manipulation methods include adding user and application profiles, modifying user and application profiles, deleting user and application profiles, and customizing user compute environments. Once activated or selected the manipulation methods cause the LUAIP to invoke the appropriate codes to accomplish the selected task and modify the datafile. The CUI includes a plurality of profiles including at least a user profile and one application profile displayed in a profile display area of the CUI window. Each profile appears as a tab associated with any other profile in the profile display area. The tabs are only displayed when valid, i.e., when an application profile exists for that application. Optionally, each profile may also have one or more other tabs designating information specific to each profile.

BRIEF DESCRIPTION OF THE DRAWINGS

For a more complete understanding of the present invention and the features and advantages thereof, reference is now made to the Detailed Description in conjunction with the attached Drawings, in which.

DETAILED DESCRIPTION OF A PREFERRED EMBODIMENT

The inventors have developed an easy, efficient and centralized information repository for user profiles and application profiles so that user and application profiles can be centrally stored, added, deleted, modified, customized, accessed, and generally utilized to facilitate computer environmental management and improve computer and user performance on distributed computer facilities.

The method of the present invention includes installing a customization user interface (CUI) on a computer system preferably having windowing capabilities. Upon installation, the CUI accesses a datafile in a previously installed or presently installed database program. The datafile will contain user and application information for central storage, manipulation, and use. The CUI is then invoked by a user or system administrator. The user or system administrator then selects from a set of procedures for modifying the datafile. The set of procedures available to the user or system administrator include at least an add procedure, a delete procedure, and an update procedure. Users can only perform the update procedure on their own record.

The CUI is a user interface that allows for easy and efficient interaction with the datafile to facilitate datafile manipulation and user environmental design. The CUI includes a window displaying a user definition note book entry or card with tabbed indices indicating associated applications and user profile information. The tabbed indices are selected by pointer-based device or keyboard activation. Once activated the window display changes to the associated window for the selected tab. Each data field associated with each window display can be modified, protected, passworded, or otherwise manipulated by the appropriate user to add, delete, or manipulate user and application information. Each tab is specific to the application selected.

The method and its associated CUI and datafile of the present invention provides a centralized repository for information needed by all application and by system administrators to facilitate system upgrades and to efficiently administer a changing work force and changing user environmental demands. The centrally located user information can be directly accessed during new application installation so that the application becomes defined in the datafile and the application becomes automatically available to all users or to a select class of users defined by their centrally stored user profiles. The application has access to user information if needed.

The method of the present invention and its associated CUI and datafile allow an administrator or user to centrally review, modify, or update data file entries and application entries. When the program implementing the method of the present invention is installed on a computer system already having applications (resident or distributed) and users, the method of the present invention pulls user information from each application, and stores the information in the datafile for subsequent CUI mediated modification. When new applications are added, the method of the present invention pulls the application and creates a CUI tab entry. The administrator then uses the CUI to assign users to the application. Each user and his/her user profile or the appropriate parts thereof are pushed to the application (i.e., transferred from the datafile to the application) making each user "familiar" to the application.

The method of the present invention also can centrally store generic agents (standard profiles) for interaction with various applications. The method is also designed to support APIs for user defined business applications.

The method of the present invention can be implemented on a single server environment, a multiple server environment, or on any other type of distributed computer system comprising a plurality of users and nodes in a fully or partially networked computer environment having a single or multiple servers and locally resident or globally distributed user applications.

The present invention is designed to operate in an environment that has windowing capabilities associated with it. Although this environment is greatly preferred, one of ordinary skill should realize that the invention could be implemented by the inclusion of routines that would perform the windowing services needed without having an actual window management system. Even in such as environment, the basic routines that would be necessary can be adequately addressed by describing a window management system.

A window management system provides many of the important features of modern user computer interfaces. A window management system allows multiple applications to interact with the user on a single computer display, and provides low level functions for the application to display data and collect input from the user. The window management system permits applications to show results in different areas of the display, to resize the screen areas in which those applications are executing, to pop-up and to pull-down menus. The window management system is a resource manager in much the same way that an operating system is a resource manager, only the types of resources differ. The window management system allocates the resources of screen area to various applications that seek to use the screen and then assists in managing these screen areas so that the applications do not interfere with one another. The window management system also allocates the resources of interaction devices to applications that require user input and then routes the flow of input information from the devices to the event queue of the appropriate application for which the input is destined.

A window management system typically has two important parts, the first is the window manager with which the end user interacts to have windows created, resized, moved, opened, closed and so on. The second is the underlying functional component, the window system, which actually causes windows to be created, resized, moved, opened, closed and so on. The window manager can be built on top of the window system. The window manager uses services provided by the window system. The window manager is to its underlying window system as a command line interpreter is to the underlying operating system kernel. Applications are built on top of the window management system. The applications built on the window management system are sometimes called clients, which in turn use the capabilities of the window management system, itself, sometimes called the server program. In some client/server window management systems, such as the X Window system, the window manager itself appears to the window system as just another client program. In other systems there is a closer relationship between the window manager and the window system than there is between a client and server. Note that multiple clients are supported by a single server, versus linked code which requires a one to one relationship. The client/server model permits clients and servers to execute on different platforms, communicating via interprocess communications or other interconnecting means. The use of interprocess communications allows computation intensive applications to reside on a powerful computer while the user interacts with the application from a workstation. In this regard, the client/server model is just a sophisticated instance of a virtual terminal protocol; such protocols, in general, share this advantage.

A window management system does not need to be built on the client/server model. For instance, the MacIntosh™ has no well defined separation between the window manager and the window system. Such separation was not necessary for the single active process, single processor design of the MacIntosh™, and would have led to additional runtime overhead. Of course, in window management systems that provide for the use of interprocess communications between the window manager and the window system, such as X Windows, News and Andrew, the interface must be designed to minimize communication delays.

Applications sharing a common window system can utilize a common interactive technique toolkit built for the WMS to assure a common look and feel. An interactive technique toolkit consists of a set of subroutines that provide different types of display objects. Interactive technique toolkits, which are subroutine libraries of interaction techniques, are mechanisms for making a collection of techniques available for use by applications. By using interactive technique toolkits, a consistent look and feel among applications sharing a common WMS can be insured. For instance, the menu style used to select window operations should be the same style used within all applications. Basic elements of the toolkit can include menus, dialog boxes, scroll bars, file selection boxes and the like, all which can conveniently be implemented in windows. Interactive technique toolkits are available for specific WMSs. Widely used toolkits include the Andrew Window Management Systems Toolkit, the MacIntosh™ Toolkit, OSF/Motif and InterViews toolkits implement Open/Look and both X Windows and News, Presentation Manager™ and the Sun View Window Management Systems Toolkit.

Figure 1:
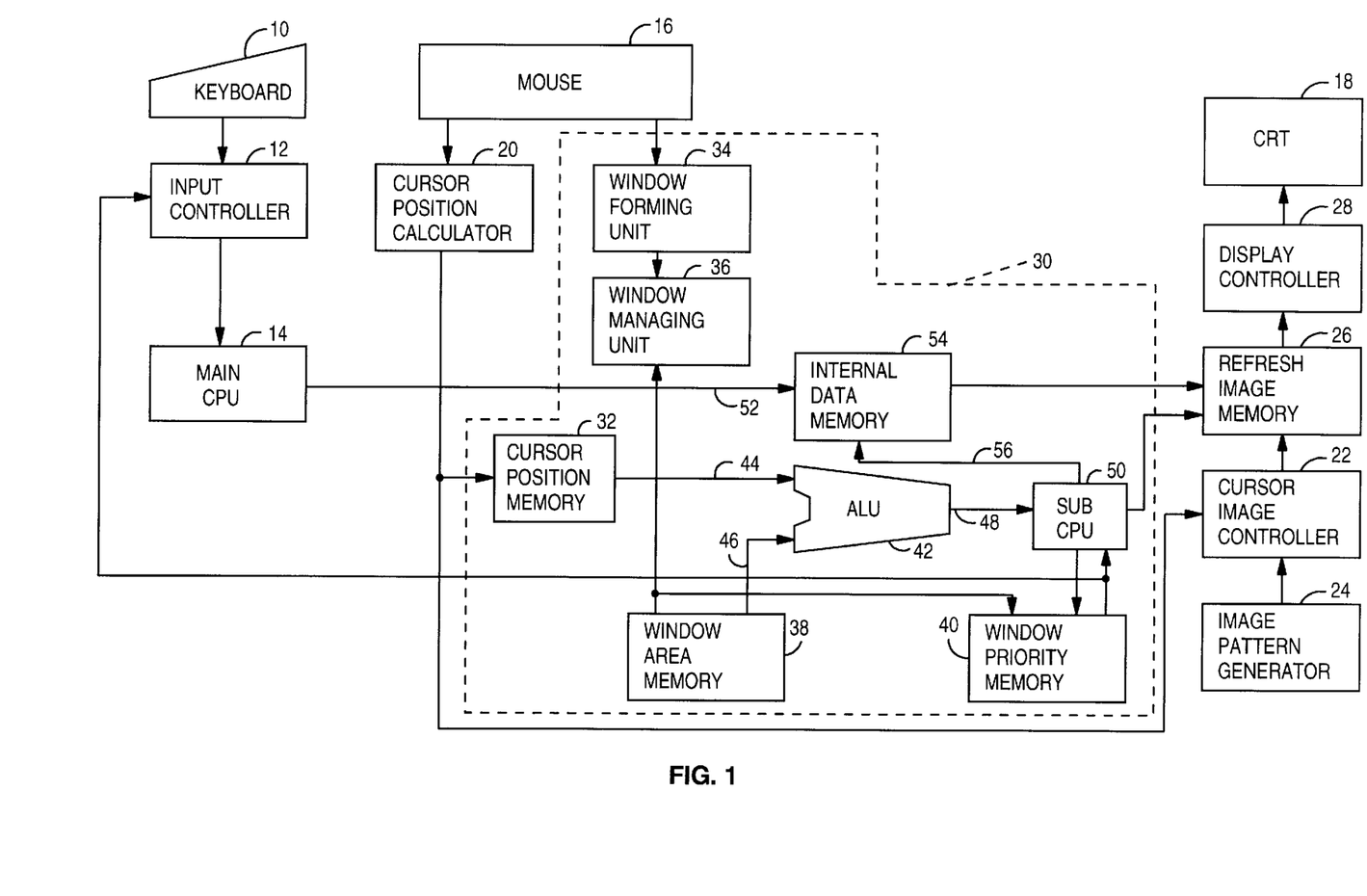
FIG. 1 is a schematic block diagram of the overall arrangement of a workstation that includes a multiwindow presentation control device.

Turning now to the present invention, FIG. 1 schematically illustrates an example of an overall system arrangement of a workstation that includes a multiwindow presentation controlling device usable in conjunction with the method of this invention and embodying a system on which the present method can be implemented. In this system, a keyboard 10 is provided as a means for entering information, such as various control commands, character data, and graphic data, which is used for information processing. The keyboard 10 is connected through an input controller 12 to main CPU 14 that performs various information processing.

Figure 2:
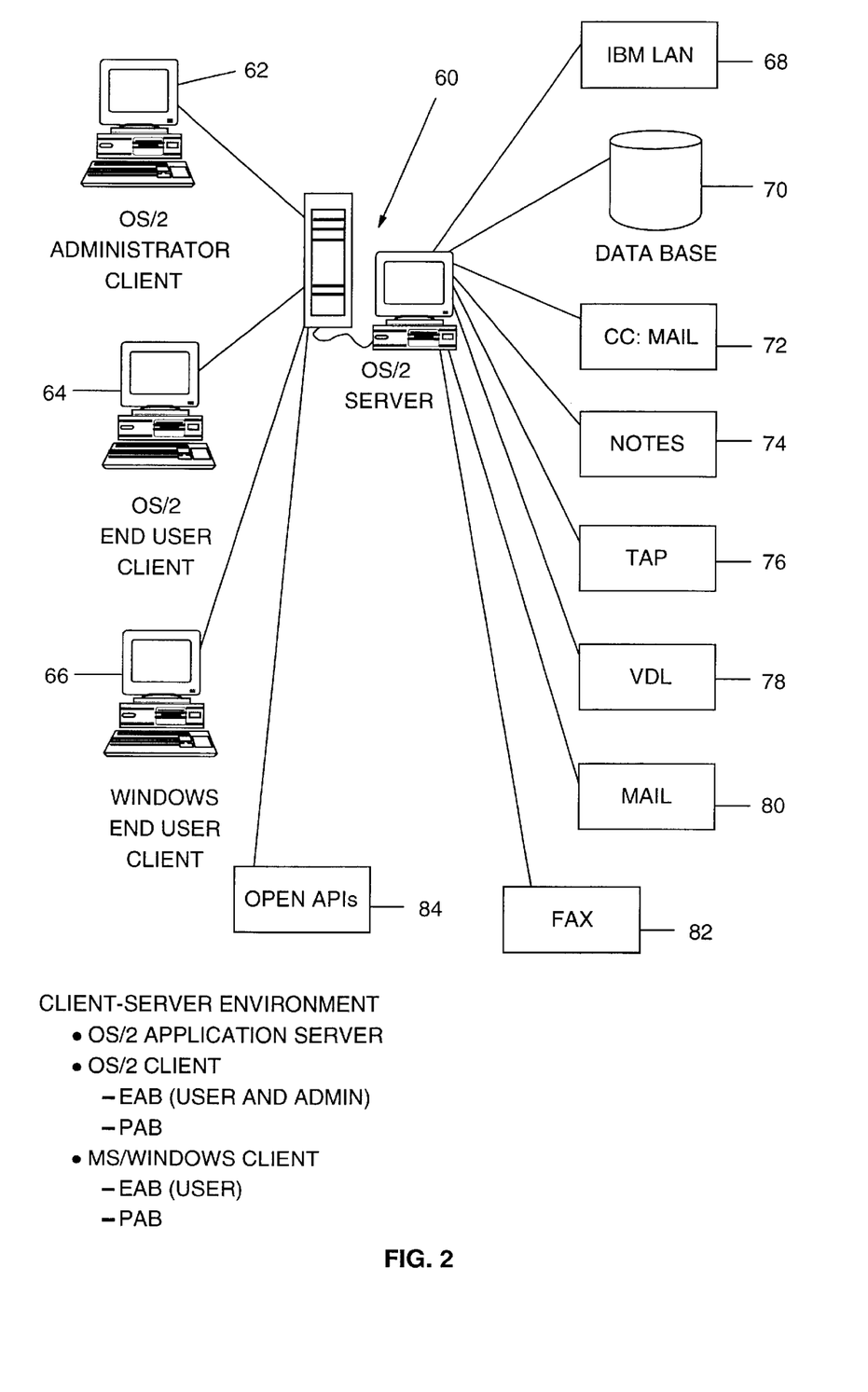
FIG. 2 is a schematic block diagram of a diagram of a single server environment or a server node of a multiple server environment.
Figure 3:
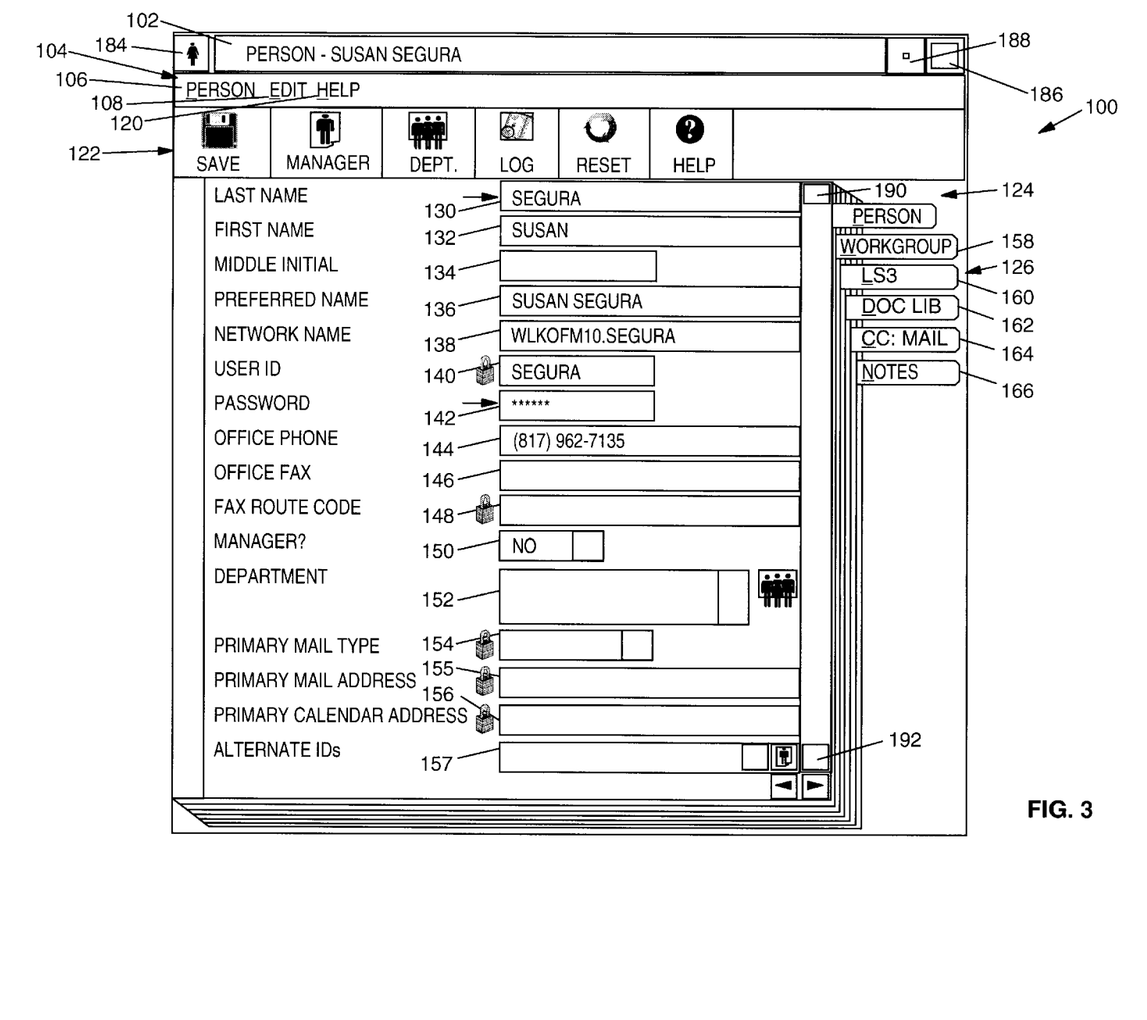
FIG. 3 is a window associated with the CUI of the present invention showing a plurality of application tabs opened to a given user tab.

The workstation also includes a pointer-based device 16, constituted by a mouse, a tablet, or the like, with the preferred devices having associated with them one or more buttons designed to provide a mechanism for selecting screen objects such as window, grid elements, data sets, and the like. The pointer-based device 16 is provided as another means for entering information including various control commands, data selection, menu option selection, and the like invocable through pointer-based device positioning and button activation. When the pointer-based device 16 is rolled or moved on a flat surface (not shown) by an operator, a pointer image or a cursor (indicated by the fish-eye of FIG. 2 or the box of FIG. 3) displayed on the display screen S of a CRT display unit 18 moves accordingly to desired coordinates on the screen S or a desired screen location. In the case of a grid as illustrated in FIGS. 2 or 3, the cursor would be used to select a desired grid element. With the use of the pointer-based device 16, therefore, it is possible to easily and quickly specify any desired screen coordinate or location and/or select any desired functional element on the display screen, such as a menu option, a grid element, or a scroll list of search hits.

The pointer-based device 16 is connected to a cursor position calculator 20, which calculates the coordinates of the cursor on the display screen S of the CRT display unit 18 substantially in real time in accordance with the movement of the pointer-based device 16 on the flat surface, and generates cursor position data. The cursor position data is supplied to a cursor image controller 22, which is connected to a cursor image pattern generator 24 and a refresh image memory 26, which may be a bit-mapped memory serving as a video RAM. The refresh image memory 26 has a memory space corresponding to one display screen of the CRT display unit 18, and is connected to the display unit via a typical display controller 28.

The cursor image controller 26 writes a cursor image pattern from the pattern generator 24 into the image memory 26 at a suitable memory address specified by the cursor position data. The cursor image written into the image memory 28 is displayed by display controller 28 at corresponding coordinates on the display screen S of the CRT display unit 18. Since the cursor display process by the cursor image controller 22 is performed substantially in real time (i.e., at a high speed), the cursor continuously and smoothly moves on the display screen in accordance with the movement of the pointer-based device 16 on the flat surface. Accordingly, the faster the pointer-based device movement on the flat surface, the faster the cursor movement on the display screen S.

The main CPU 14 and the pointer-based device 16 are connected to a window presentation controlling section 30, which carries out the general management of windows formed or opened on the screen S of the display unit 18 by the operator, using the pointer-based device 16. More specifically, in response to instructions from the operator or user, the window presentation controlling section 30 may (1) change the window-overlapping order to make any desired window active, (2) change the size of each window or (3) move it around on the screen.

The window presentation controlling section 30 has a random access memory (RAM) 32 to which the cursor position data from the cursor position calculator 20 is also supplied. The RAM 32 temporarily stores the output data of the cursor position calculator 20 as present-cursor position data; it also stores the last-cursor position data. When the cursor position data changes according to the movement of the pointer-based device 16 on the flat surface, the RAM 32 updates its contents so as to store new data from the cursor position calculator 20 as the present-cursor position data. One convenient format for storing cursor position data from the cursor position calculator 20 is in the form of a data table stored in the RAM 32. Obviously, the data table of the RAM 32 is updated with movement of the pointer-based device 16. Throughout the following description, the RAM 32 will be referred to as "cursor position memory."

The window presentation controlling section 30 also has a window forming unit 34, connected to pointer-based device 16. When the operator or user enters data to define the position and the size of a new rectangular window to form or open that window using the pointer-based device 16, this data is transferred to the window forming unit 34. Based on the input data, the window forming unit 34 generates data to specify the new window. This data is supplied to a window managing unit 36. The window managing unit 36 refers to the windows opened already, and determines the window manner and the display priority for the new window. The window number and management codes representing the display priority are affixed to the received window-specifying data and are supplied to two RAMs 38 and 40.

The RAM 38 receives and stores that portion of the output data of the window managing unit 36 which is associated with the window number and the window size (i.e., coordinate data representing the coordinates of two corner points, which diagonally face each other on the display screen and define the area of the new rectangular window). Again it is convenient to store with data as a data table in the RAM 38. That is, the RAM 38 stores data representing the areas of the windows, window attributes, and associated window objects as the window appears on the screen S in the order the windows are opened, defined, or created by the user. In the following description, the RAM 38 will be referred to as "window area memory."

The RAM 40 receives and stores that portion of the output data of the window managing unit 36 which is associated with the display priority. The display priorities of the opened windows on the screen S of the CRT display unit 18 are initially determined by the window managing unit 36 in such a manner as to coincide with the order they have been opened. As the RAM 40 stores data representing the display priority of each window opened on the display screen, it will be referred to as "window priority memory" in the following description.

For example, if the new window is given the display priority of "1" (the highest display priority) at the front most position on display screen S, its entire region is visible. A second window with a display priority of "2" that overlaps with the window having the priority "1" will lie behind the later one. Therefore, that portion of the window with the priority "2" which overlaps the window with the priority "1" is invisible. Additionally, a window with a display priority of "3" i.e., a priority lower than those having priorities "2" and "1" will have its portions that overlap the windows having the priority "2" or "1" lying behind those windows and thus those portions will be invisible on the display screen S.

The data in the window priority memory 40 which specifies the window having the highest display priority, (i.e., the active window) is supplied to the input controller 12. Consequently, the input controller 12 can manage in which window on the display screen S the information currently entered by the operator or user through either the keyboard 10 or the pointer-based device 16 is to be written.

An arithmetic and logic unit (ALU) 42 is connected to the cursor position memory 32 and the window area memory 38, so that it can access these memories. Accordingly, the ALU 42 receives the present-cursor position data that is always updated, from the memory 42 over a signal line 44, and receives the position data of all currently opened windows on the screen S, from the memory 38 over a signal line 46. Based on the output from the memories 32 and 38, the ALU 42 automatically detects, in real time, in which window on the display screen S the cursor lies.

Specifically, the ALU 42 compares the present position data of the cursor with the coordinate data defining the position and the size of all currently opened windows, sequentially. Here, the ALU 42 correlates the present-cursor position data, usually in x and y coordinates, with position data that define each rectangular window on the display screen S, usually two corner points (upper left and lower right), and determines whether the cursor has moved within a given window or has moved from one window to another. When the ALU 42 detects a change in the window which contains the cursor, it generates a detection signal 48.

Moreover, the ALU 42 also correlates the cursor position data with specific attributes and objects associated with the window that are stored in the window area memory 38. These attributes and objects can include menu options, grid elements, hits list selections, hot spots, and the like. Thus, the user can move the cursor not only to select which window is active, but also to invoke actions associated with the windows by positioning the cursor at a desired location in a given window. Depending on the window location, the ALU 42 will either directly activate an associated set of instructions for processing on the CPU 14 or secondary CPU or await user selection of an action through the use of the pointer-based device buttons. Thus, in response to a change in cursor position and/or activation of a pointer-based device button, the ALU 42 generates the detection signal 48 representing the associated change in state, i.e., change in active window, selection of a grid element, selection of a window object such as a menu option, or the like. This signal 48 is transferred to the main CPU 14 or to a sub CPU 50.

The main CPU 14 or the sub CPU 50 then performs internal control operations necessary for automatically executing the desired activity. Which of the CPU's is used may depend on the type of action requested, on the number of instruction associated with the action, or other routing criteria for maximizing system efficiency. Of course, the new state of the system will be manifest in the window priority memory 40.

The sub CPU 50 is connected to the window priority memory 32 as well as to the refresh image memory 26. Upon completion of rewriting the contents of the window priority memory 40, the sub CPU 50 secures a memory region in the image memory 26 that corresponds to the position and the size of the currently-active window and all other opened windows.

Information and/or instructions in the form of character data and/or graphic data entered by the user using either the keyboard 10 or the pointer-device 16 are temporarily stored in an internal data memory 54 of the window presentation controlling section 30 through a data bus 52 for keyboard entered information and through a data bus 56 from sub CPU 50 for point-based entered information. Depending on the type of information entered, sub CPU 50 accesses memory 54 and read outs from the memory the information (e.g., character data, menu selections, window object and/or attribute selection, etc.) that has been entered and is either to be written on or in a given window or is being retrieved from the activation of some window object like a grid element of a grid. The entire read-out information is transferred, under the control of the sub CPU 50 or the main CPU 14, to the refresh image memory 26 and stored in the memory region there that has been secured for the active window. In a similar manner, information entered by the user from either input device will cause the system to execute the need instructions to modify the display screen or to update the display screen with additional windows or options depending of the information entered by the user. For example, if the user positions the cursor in the grid shown in FIG. 3 and selects the boxed grid element, the system of the present invention will relate the cursor position to the window coordinates to determine the grid element selected and transfer the information represented by the grid element to the main CPU 14 or the sub CPU 50 for the construction of the search query, generate the instructs necessary to execute the search on the data set, and to display the search results on the display screen S of the CRT 18.

For example, some hardware may be replaced where necessary by software program as needed, without departing from the basic technical principle of the aforementioned auto-window presentation. In this example, it is likely that the active window switching speed can be increased by improving the processing ability of involved CPUs. Further, ALU 42 is not restricted to perform the correlation between the present-cursor position data with the window coordinate data defining the position and the size of each window, only in the aforementioned manner; this correlation may also be modified in various ways.

Referring to FIG. 2, a server environment is depicted including a server 60 running a windowing operating system such as OS/2. The server 60 supports an administrator node 62 and two user nodes 64 and 66. The administrator and user nodes can be OS/2 nodes or nodes with other operating systems and appropriate communication software. The server 60 can also support access to local area networks such as an IBM LAN 68 and database access such as database 70. In addition to the associated hardware, the server 60 can support either resident or distributed applications software programs such as cc:Mail 72, Notes 74, TaP 76, VDL 78, mail 80, and Fax 82. In addition, the server 60 can also support open APIs 84.

Referring to FIG. 3, a CUI window display presentation, generally 100, of one embodiment of the CUI of the present invention is shown. The CUI 100, includes a user identification box 102, a plurality of pull down menus 104 including a Person menu 106, a Edit menu 108, and a Help menu 120, and a plurality of function icons 122. The underlined letter of the pull down menu descriptors indicate that the menus can be invoked by merely typing the underlined letter instead to using a pointer-based device to reveal the menu selections. The CUI 100 also includes a user profile window 124 with a plurality of right tabs 126 and optionally a plurality of bottom tabs 128, not shown. The CUI 100 also is shown as a book or set of overlaid fanned cards showing the cards beneath the currently displayed card. The right tabs 126 represent current applications. The bottom tabs 128 can represent other attributes of the user profile window 124 such as special groups and special classes of users.

The user profile window 124 includes last name, first name, middle initial, and preferred name boxes, 130, 132, 134, and 136, respectively. The user profile window 124 also includes network name, user ID, and password boxes 138, 140, and 142, respectively. Further, the user profile window 124 includes office phone, office fax, and fax route code boxes 144, 146, and 148, respectively. The user profile window 124 includes manager and department boxes, and primary mail type, primary mail address, primary calendar address, and alternate IDs or aliases 150, 152, 154, and 156, respectively. Of course, many of these boxes are only representative of a particular user profile window. One of ordinary skill would recognize that the particular box configuration and box descriptions are solely a function of the inventors layout in this embodiment and other presentations and configurations are fully within the teaching and scope of the present invention.

Figure 4:
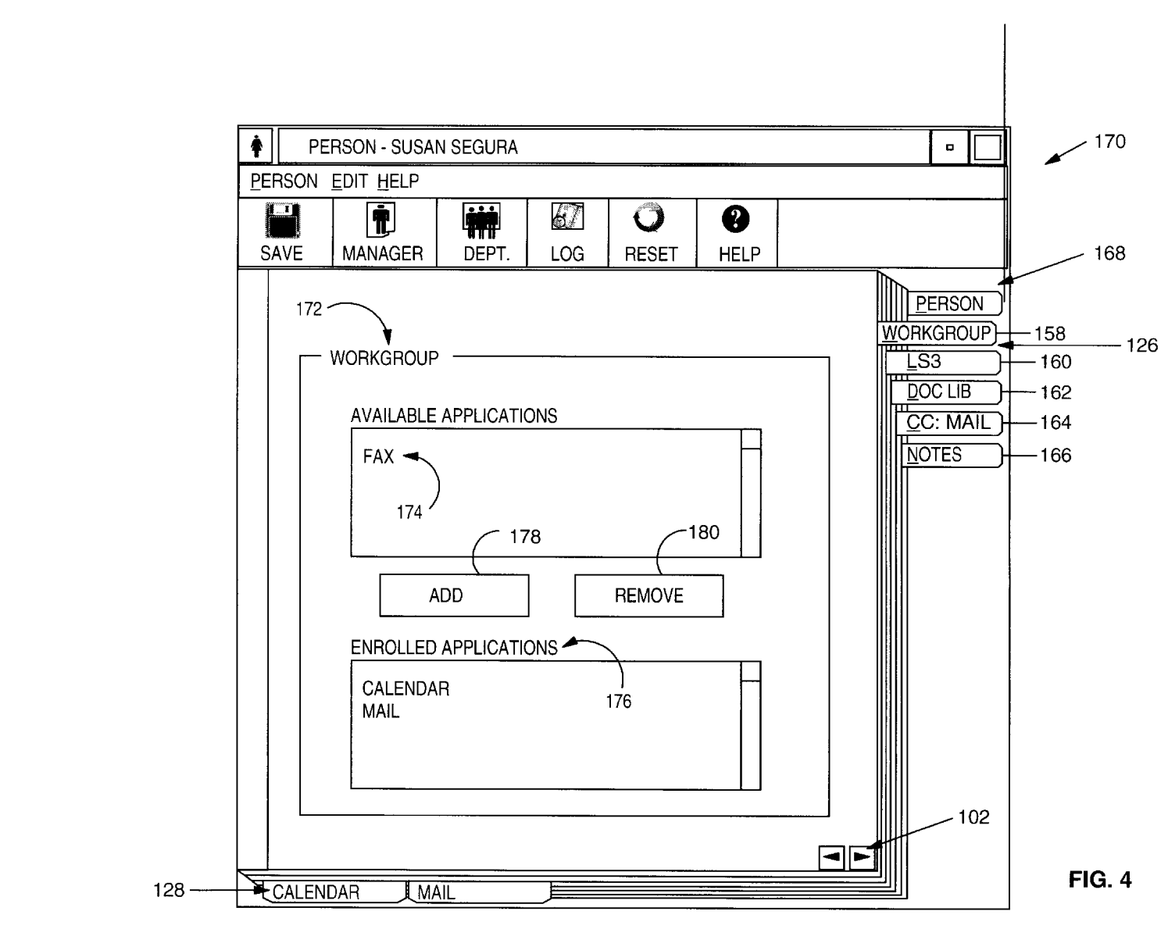
FIG. 4 is a window associated with the CUI of the present invention showing a plurality of application tabs and application specific tabs.

As shown in FIG. 4, the right tabs 126 include one tab for each of the applications which are registered to the server to which the CUI is attached. For the sake of clarity, FIG. 4 shows five right tabs 126: WorkGroup, LS 3, DocLib, cc:Mail, and Notes 158, 160, 162, 164, and 166, respectively. Of course, the tabs could equally well represent other applications used in other compute environments and because the CUI can be tailor made for each particular computer and compute environment, the exact description associated with the tabs may change from environment to environment and are designed at installation or upon updating the datafile as described more completely below.

If a user or administrator wanted to check the current information for the selected user for the WorkGroup tab 158, the user or administrator would either use a pointer-based device to select the WorkGroup tab or type a "w" on the keyboard. Once the WorkGroup tab 158 has been selected the CUI 100 brings a WorkGroup profile window 168 to the forefront of the profile area 170 of CUI 100, as shown in FIG. 4. FIG. 4 shows the depiction of the WorkGroup profile window 168 including an Available Applications box 172 with available entries 174, an Enrollment Applications box 176, and Add and Remove icons 178 and 180, respectively, for adding and removing WorkGroup enrollments or application. Boxes 172 and 176 also include up and down list scrollers 182 for scrolling enrollment and application lists. The WorkGroup profile window 168 shows right tabs 126 and bottom tabs 128. Of course, right tabs 126 are identical to the tabs shown on the user profile window 124. Bottom tabs 128 are profile window specific and designate selections available for a given tabbed application. Of course, bottom tabs 128 are optional for each profile window.

The CUI 100 also includes a close icon 184, a maximize icon 186, a minimize icon 188, and up and down page scroll icons, 190 and 192, respectively.

Figure 5:
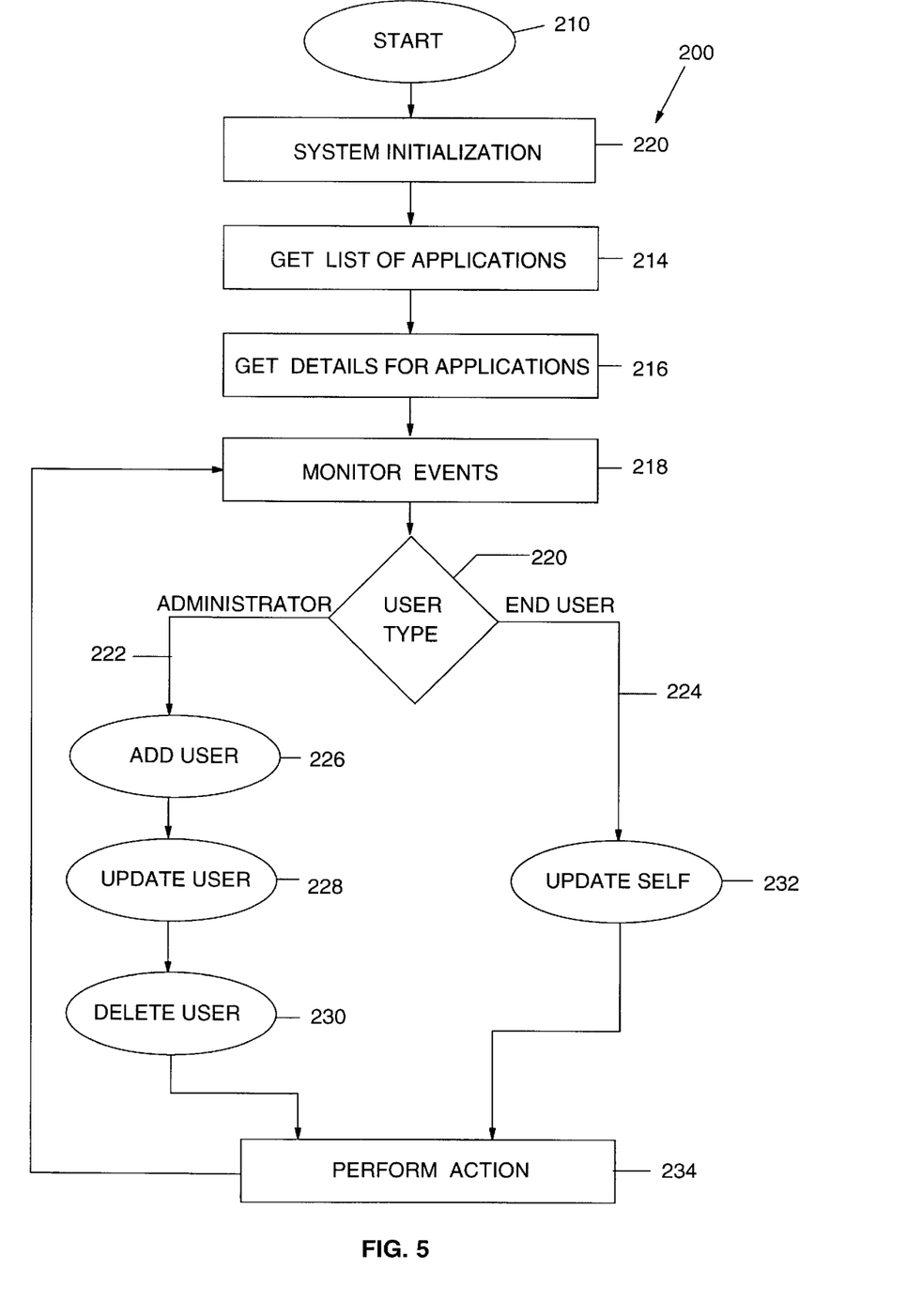
FIG. 5 depicts a flow diagram for a central database interface for storing and manipulating user and application information on a distributed computer system or environment.

The datafile and CUI are not a built in feature of the operating system and must be first installed on the computer system so that application and user profile information can then be centrally located and accessible for efficient manipulation and system environmental control. Referring now to FIG. 5, a flow chart 200 of the installation protocol for installing the CUI of the present invention is depicted. The installation protocol depicted in the flow chart 200 includes the steps of starting the initialization procedure 210, initializing the system software or operating system 212, obtaining an application list from the system software 214 and obtaining the details for each application from the system software 216.

Once these steps are executed, which normally occurs only one time and generally during the installation of the LUAIP software used to implement the methods of the present invention, the LUAIP is ready for interaction with a user or a system administrator. Of course, the available procedures that the user can access as opposed to the system administrator will be different as further defined below. Additionally, the software of the present invention can provide for user groups with differing access privileges.

With installation complete, the LUAIP goes into a semi-hibernation state or monitoring state 218 awaiting a user or administrator selected event. When the CUI is activated the monitoring state 218 passes the received information onto a user type discriminator or user type conditional branch 220. The conditional branch 220 tests the user name for determine the user's status or type. If the user is an administrator or has administrator privileges, then the conditional branch 220 passes control to an Administrator branch 222, otherwise control is passes to the End User branch 224.

The administrator then can select one of three manipulation methods: an Add User method 226, an Update User method 228, and a Delete User method 230. An end user can only perform one manipulation method, an Update Self method 232. These methods are described more completely below. Each method includes several steps to perform the given or assigned task. Once the selected method has been invoked and appropriate information sent to the datafile, the LUAIP performs the necessary actions in a perform action step 234 which completes the selected task and goes back to the event monitoring step 218. Thus, the LUAIP is an installed methodology which centrally localizes user and application information in a datafile associated with a database previously or currently installed on the computer system and allows for the manipulation of the localized information by the user by and through the activation of menu options and icons associated with the CUI.

Figure 6:
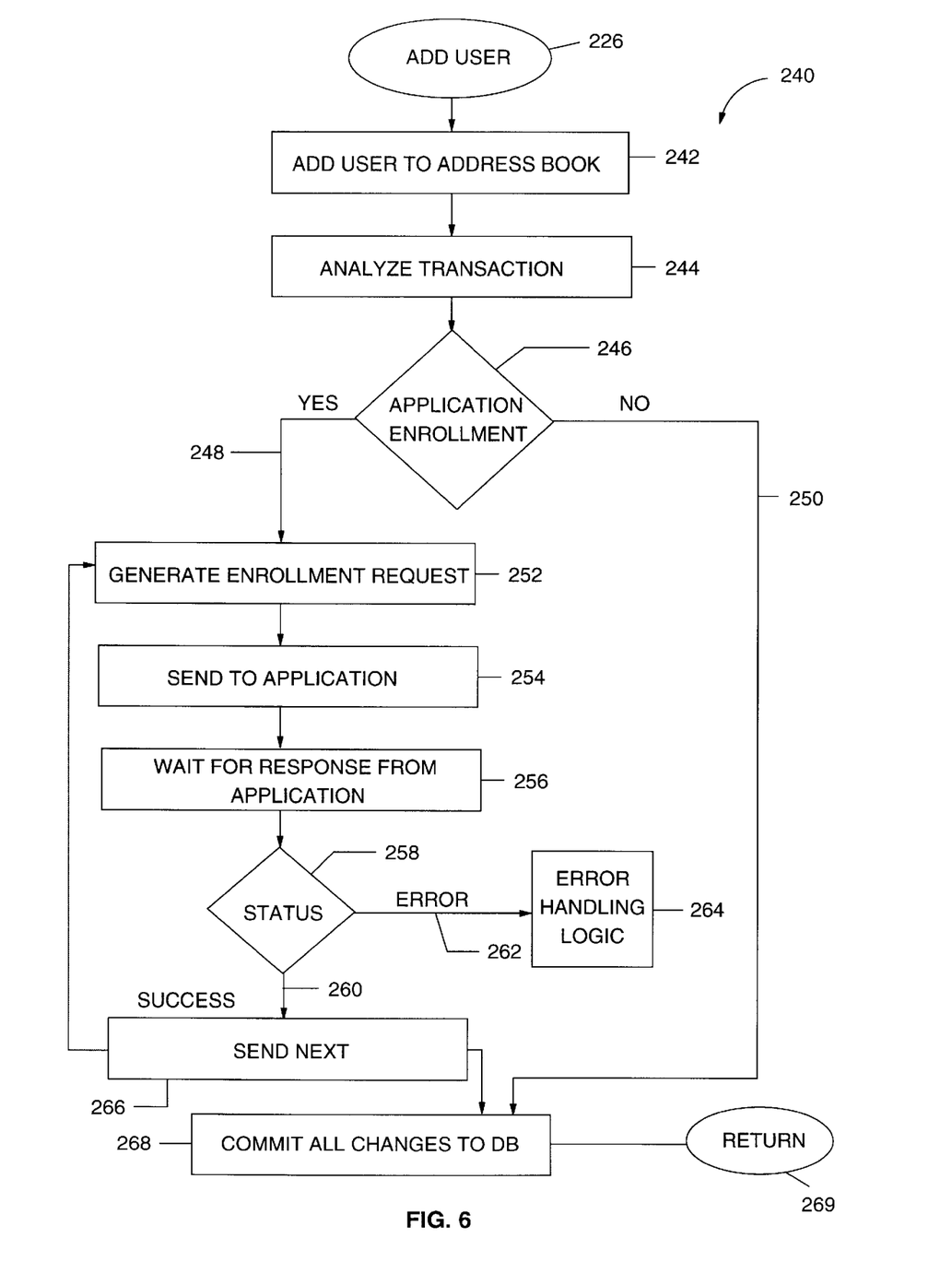
FIG. 6 depicts a flow diagram for adding a user to the database and enrolling the user in one or more resident or distributed applications.

Referring now to FIG. 6, a flow chart 240 of the Add User method 226 of FIG. 5 is depicted. If activated from the monitoring loop of FIG. 5, the Add User method 240 adds a designated user to the address book in step 242 and then analyzes the resulting transaction in step 244. The Add User method 240 then performs a conditional branch 246 to determine whether the added user is to be enrolled in any system applications. The conditional branch 246 passes control to a generate enrollment request step 252 due to a yes condition in branch 246 through the yes branch path 248. In the case of a no condition, the branch 246 transfers control to the commit changes to the datafile (DB) step 268 via a no branch path 250. The application enrollment branch 248 begins with step 252 which generate an enrollment request or obtains the information that the administrator has entered through the activation or selection of the appropriate menu options, icons, boxed or tabbed fields associated with the CUI. Once a generate enrollment request has been received the request is sent to the appropriate or designated application in a send to application step 254. The enrollment path 248 then waits for the application to response to the enrollment request in step 256. When the application responds, the response is analyzed in a conditional status check step 258. The status check 258 determines whether the enrollment was successfully accomplished or failed. If the enrollment is successful, the status check 258 passes control to a send next step 266 through a path 260. If the enrollment fails, the status check 258 passes control to an error handling logic unit 264 through path 262. The send next step 266 determines whether additional enrollments have been specified. If additional enrollments are specified, then the send next step 266 transfers control back to the generate enrollment request step 252 via the return path 267. If no further activity is requested, then the sent next step 266 transfers control to the commit step 268 which commits the changes to the datafile in the database DB and then returns control back to the designated part of FIG. 5 in a return step 269.

Figure 7:
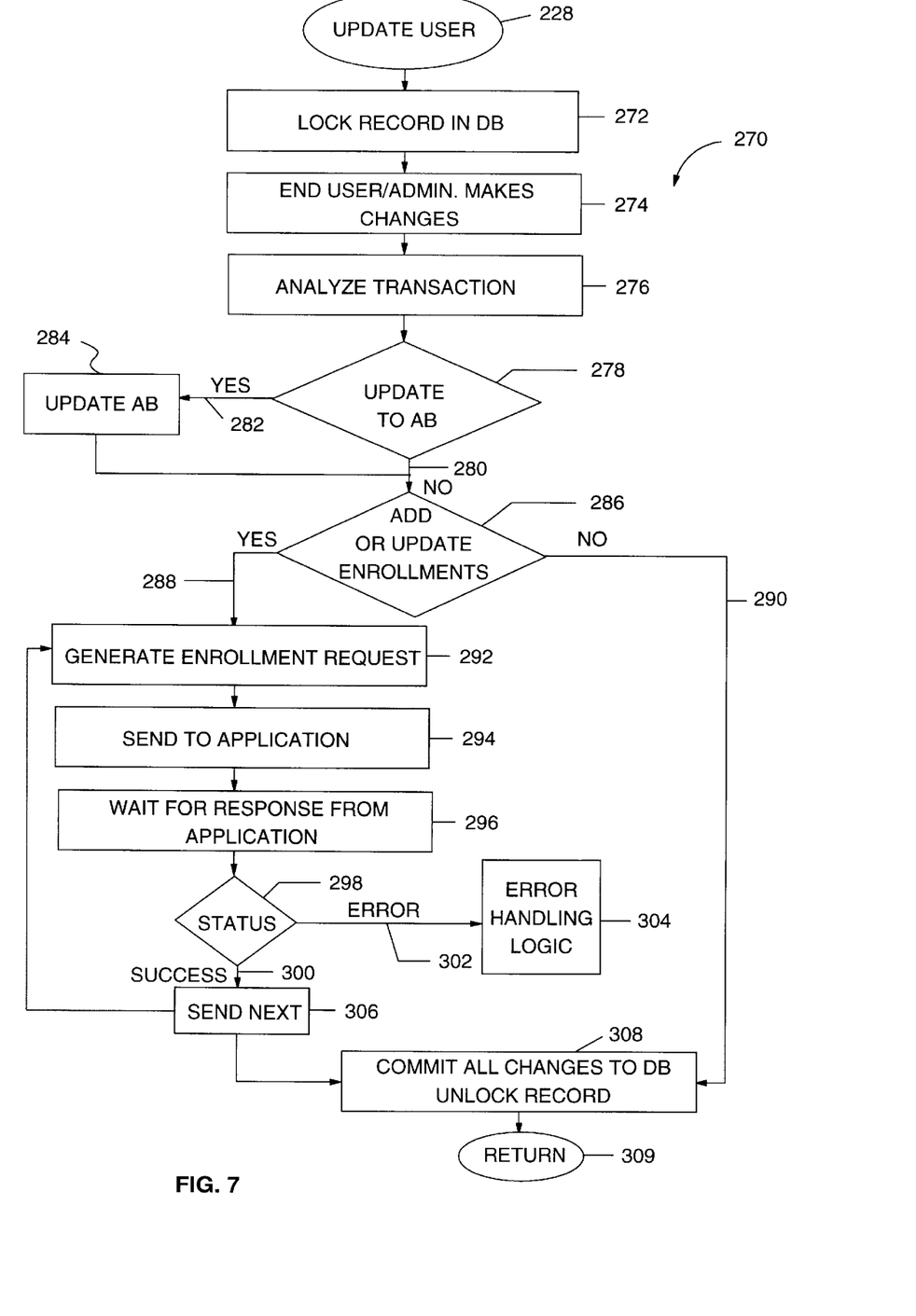
FIG. 7 depicts a flow diagram for updating a user's information and the user's enrollment in one or more resident or distributed applications.

Referring now to FIG. 7, a flow chart 270 of the Update User method 228 of FIG. 5 is depicted. The Update User method 228 first locks the selected user data entry in the datafile on the installed database in a locking step 272. The system administrator or qualified user then makes the designed changes in a changing step 274. The changes made in step 274 are then analyzed in a transaction analyze step 276. The analyze step 276 analyzes the requested changes to determine whether the changes are directed to the selected user address book (AB in the FIG. 7) or an add or update user enrollments. Once the analysis step 276 is performed, the analysis and change data is passed onto a update AB conditional branch 278 which performs a logical test to determine the type of designated changes. The branch 278 passes control to either an update AB step 284 along a yes path 282, where yes represent that the change is to the user AB entry, or an add or update enrollment conditional branch 286 along a no path 280. Conditional branch 286 operates in an analogous fashion to conditional branch 278. The branch 286 passes control to either a generate enrollment request step 292 along a yes path 288 or a commit changes to the datafile in the installed database DB and unlock the locked record step 308, along a no path 290. In a sequence of flow steps analogous to steps 226 through 269 of FIG. 6, steps 292 through 309 perform the sequence of steps to send the enrollment request to the application, step 294, to wait for the application response, step 296, and to check the application response status in a conditional branch step 298 that passes control to the error handling logic 304, which is generally the same logic unit as that in described and shown in FIG. 6, along an error path 302. If the status check is successful the sequence proceeds to send next request step 306 along a success path 300 which either returns control to the generate enrollment request step 292 or to the commit step 308. The commit step 308 after performing its indicated function, returns control to the flow chart of FIG. 4 via a return step 309.

Figure 8:
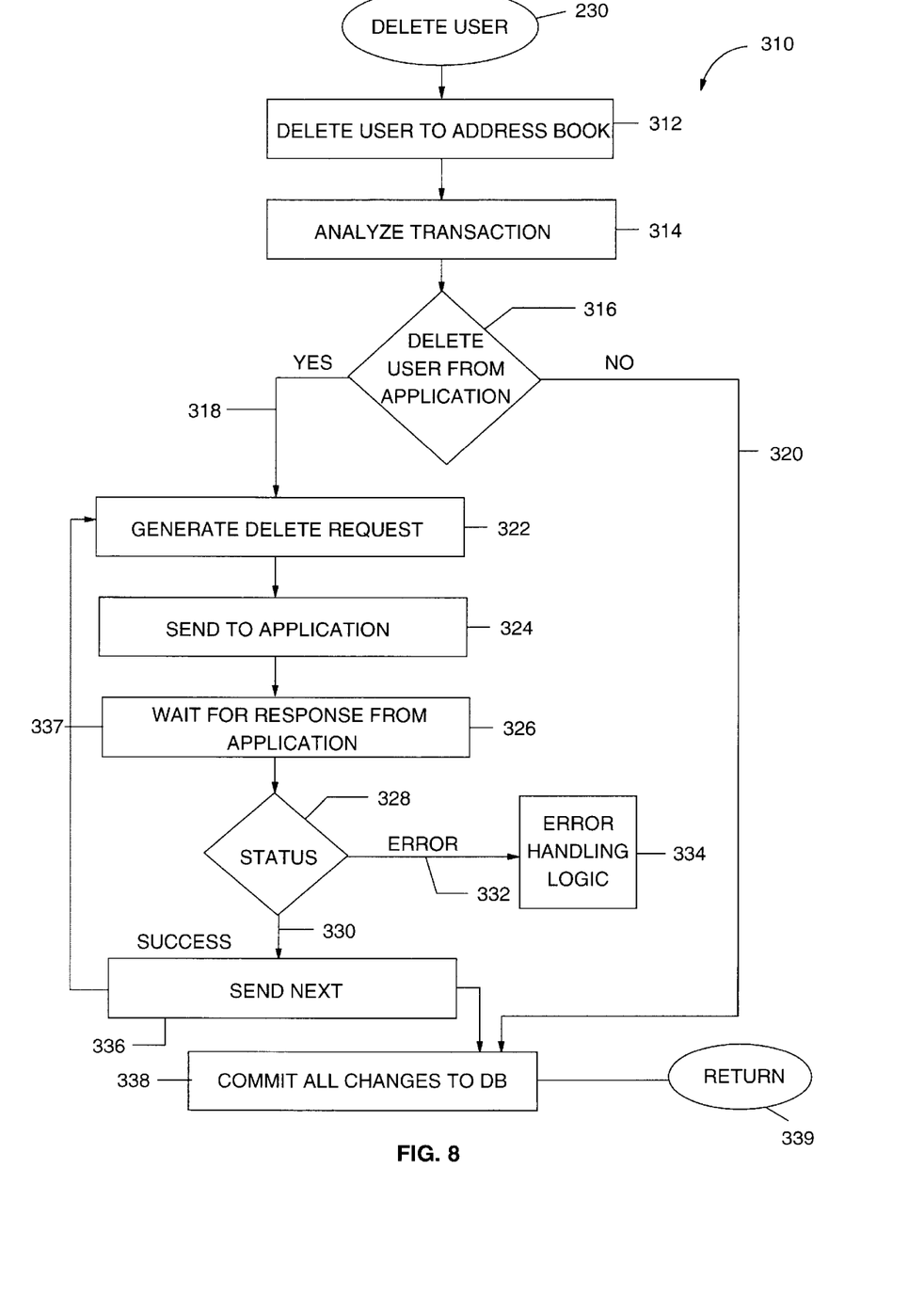
FIG. 8 depicts a flow diagram for deleting a user from the database and removing the user from one or more or distributed resident applications.

Referring now to FIG. 8, a flow chart 310 of the Delete User method 230 of FIG. 5 is depicted. If activated from the monitoring loop of FIG. 5, the Delete User method 310 deletes a designated user from the address book in step 312 and then analyzes the resulting transaction in step 314. The Delete User method 310 then performs a conditional branch 316 to determine whether the deleted user is to be de-enrolled from any system applications to which that user had been previously enrolled. The conditional branch 316 passes control to a generate delete request step 322 due to a yes condition in branch 316 through a yes branch path 318. In the case of a no condition, the branch 316 transfers control to a commit changes to the datafile in the installed database (DB) step 338 via a no branch path 320. The application delete branch 318 begins with the step 322 which generate an delete request or obtains the information that the administrator has entered through the activation or selection of the appropriate menu options, icons, boxed or tabbed fields associated with the CUI. Once a generate delete request has been received the request is sent to the appropriate or designated application in a send to application step 324. The delete path 318 then waits for the application to response to the delete request in a wait for response step 326. When the application responds, the response is analyzed in a conditional status check step 328. The status check 328 determines whether the delete was successfully accomplished or failed. If the delete is successful, the status check 328 passes control to a send next step 336 through a success path 330. If the delete fails, the status check 328 passes control to an error handling logic unit 334 (generally, the same error handling logic unit in FIGS. 5–7) through an error path 332. The send next step 336 determines whether additional deletes have been specified. If additional deletes are specified, then the send next step 336 transfers control back to the generate delete request step 322 via a return path 337. If no further activity is requested, then the sent next step 336 transfers control to the commit step 338 which commits the changes to the datafile in the datafile on the installed database DB and then returns control back to the designated part of FIG. 5 in a return step 339.

Figure 9:
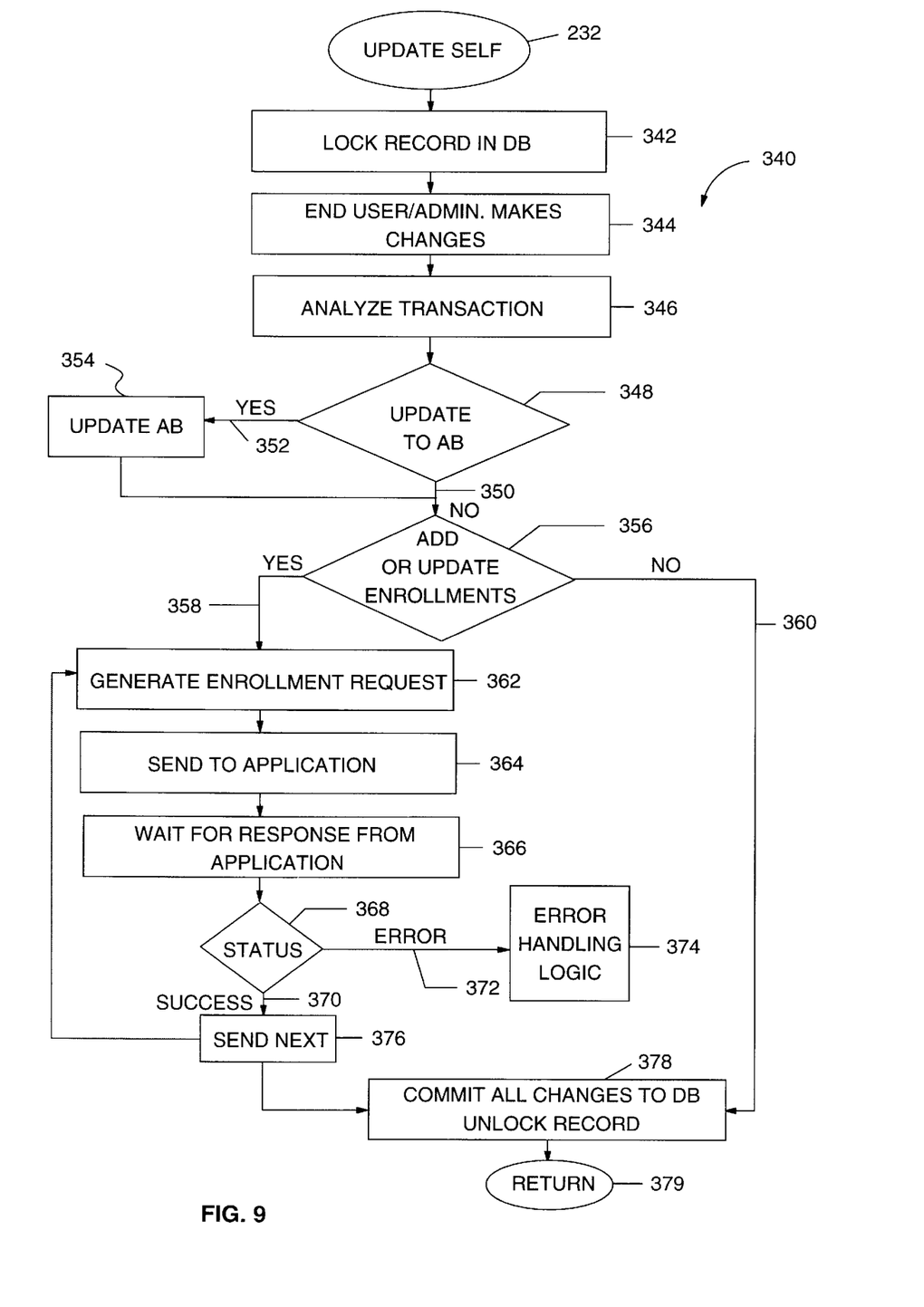
FIG. 9 depicts a flow diagram for a user directed updating of the user's database information and enrollment in one or more or distributed resident applications.

Referring now to FIG. 9, a flow chart 340 of the Update Self method 232 of FIG. 5 is depicted. The Update Self method 340 first locks the selected user data entry in the datafile on the installed database in a locking step 342. The user then makes the designed changes in a changing step 344. The changes made in step 344 are then analyzed in a transaction analyze step 346. The analyze step 346 analyzes the requested changes to determine whether the changes are directed to the selected user address book (AB in the FIG. 9) or to an add or update user enrollments. Once the analysis step 346 is performed, the analysis and change data is passed onto a update AB conditional branch 348 which performs a logical test to determine the type of designated changes to be made. The branch 348 passes control to either an update AB step 354 along a yes path 352, where yes represent that the change is to the user AB entry, or an add or update enrollment conditional branch 356 along a no path 350. The conditional branch 356 operates in an analogous fashion to conditional branch 348. The branch 356 passes control to either a generate enrollment request step 362 along a yes path 358 or a commit changes to the datafile in the installed database DB and unlock the locked record step 378, along a no path 360. In a sequence of flow steps analogous to steps 226 through 269 of FIG. 6, steps 362 through 379 perform the sequence of steps to send the enrollment request to the application, step 364, to wait for the application response, step 366, and to check the application response status in a conditional branch step 368 that passes control to the error handling logic 374, which is generally the same logic unit as that in described and shown in FIG. 6, along an error path 372. If the status check is successful the sequence proceeds to send next request step 376 along a success path 370 which either returns control to the generate enrollment request step 362 or to the commit step 378. The commit step 378 after performing its indicated function, returns control to the flow chart of FIG. 5 via a return step 379.

Although several manipulation methods have been described in detail and shown in flow chart format in relationship to the start flow chart shown in FIG. 5, one of ordinary skill in the art would recognize that other manipulation methods could easily be added to the flow chart of FIG. 5.

While in accordance with the patent statutes, the best mode and preferred embodiments of the invention have been described, it is to be understood that the invention is not limited thereto, but rather is to be measured by the scope and spirit of the appended claims.

I claim:

1. A method for centrally storing user and application information and automatically distributing such information to and from heterogeneous applications requiring directory and enrollment information, the applications installed in a distributed computer environment running a windowing type operating system, the method comprising the steps of:

a. installing a localized user and application information procedure (LUAIP) comprising a central datafile, a customization user interface (CUI), and a plurality of data entries manipulation user invocable procedures designed to modify the information contained in the datafile and in the installed applications;

b. monitoring data entry devices for user input from a series of menus or icons associated with a CUI display window designed to select an invocable procedure associated with the LUAIP;

c. executing the selected LUAIP procedure to accomplish the user modification of one or more datafile entries and/or the information associated with one or more installed applications, thereby automatically synchronizing the directory and enrolment information in the central datafile and the installed applications; and d. returning to the monitoring step (b) for further user input.

2. The method of claim 1, wherein the procedures comprise an add user procedure, a delete user procedure, an update user procedure, and an update self procedure.

3. The method of claim 1, wherein the CUI comprises a plurality of profiles including at least a user profile and at least one application profile displayed in a profile display area of the CUI window where each profile is represented by a tab associated with an active profile.

4. The method of claim 3, wherein the CUI further comprises tabs associated with an active profile window in the profile display area where the tabs are designed to designate profile specific information.

5. The method of claim 2, wherein the add user procedure comprises the steps of:
 a. adding a user to the address book;
 b. analyzing the transaction;
 c. checking the transaction in an application enrollment conditional branch step;
 d. branching to a yes path due to a successful enrollment check;
 e. generating an enrollment request from the yes branch;
 f. sending the enrollment request to the application;
 g. waiting for a response from the application;
 h. checking a status of the application response in a check status conditional branch;
 i. branching to an error handling logic unit in response to an error status;
 j. branching to a send next step in response to a successful status;
 k. jumping back to step (e) to complete any additional add user requests in a send nest step;
 l. branching to a no path due to an unsuccessful enrollment check;
 m. committing all changes to the datafile; and
 n. returning to the monitor events step.

6. The method of claim 2, wherein the delete user procedure comprises the steps of:
 a. deleting a user from the address book;
 b. analyzing the transaction;
 c. checking the transaction in an application delete conditional branch step;
 d. branching to a yes path due to a successful delete check;
 e. generating a delete request from the yes branch;
 f. sending the delete request to the application;
 g. waiting for a response from the application;
 h. checking a status of the application response in a check status conditional branch;
 i. branching to an error handling logic unit in response to an error status;
 j. branching to a send next step in response to a successful status;
 k. jumping back to step (e) to complete any additional delete user requests in a send next step;
 l. branching to a no path due to an unsuccessful delete check;
 m. committing all changes to the datafile; and
 n. returning to the monitor events step.

7. The method of claim 2, wherein the update user procedure comprises the steps of:
 a. locking the record in the datafile;
 b. updating information associated with a user;
 c. analyzing the transaction;
 d. checking the transaction in an update datafile conditional branch step;
 e. branching to a yes path due to an update datafile check and updating the datafile in accordance with the inputted update and continuing to an add or update enrollment check;
 f. continuing through a no path to the add or update enrollment check;
 g. checking the transaction for an add or update enrollment request in the add or update enrollment conditional branch step;
 h. branching to a yes path due to a successful enrollment check;
 i. generating an enrollment request from the yes branch;
 j. sending the enrollment request to the application;
 k. waiting for a response from the application;
 l. checking a status of the application response in a check status conditional branch;
 m. branching to an error handling logic unit in response to an error status;
 n. branching to a send next step in response to a successful status;
 o. jumping back to step (e) to complete any additional enrollment requests in a send next step;
 p. branching to a no path due to an unsuccessful enrollment check;
 q. committing all changes to the datafile; and
 r. returning to the monitor events step.

8. The method of claim 2, wherein the update self procedure comprises the steps of:
 a. locking the record in the datafile;
 b. updating information associated with a user;
 c. analyzing the transaction;
 d. checking the transaction in an update datafile conditional branch step;
 e. branching to a yes path due to an update datafile check and updating the datafile in accordance with the inputted update and continuing to an add or update enrollment check;
 f. continuing through a no path to the add or update enrollment check;
 g. checking the transaction for an add or update enrollment request in the add or update enrollment conditional branch step;
 h. branching to a yes path due to a successful enrollment check;
 i. generating an enrollment request from the yes branch;
 j. sending the enrollment request to the application;
 k. waiting for a response from the application;
 l. checking a status of the application response in a check status conditional branch;
 m. branching to an error handling logic unit in response to an error status;
 n. branching to a send next step in response to a successful status;
 o. jumping back to step (e) to complete any additional enrollment requests in a send next step;
 p. branching to a no path due to an unsuccessful enrollment check;

q. committing all changes to the datafile; and r. returning to the monitor events step.

9. Apparatus for centrally storing user and application information and automatically distributing such information to and from heterogeneous applications requiring directory and enrollment information, the applications installed in a distributed computer environment running a windowing type operating system comprising the steps of:

a. means for installing a localized user and application information procedure (LUAIP) comprising a central datafile, a customization user interface (CUI), and a plurality of data entries manipulation user invocable procedures designed to modify the information contained in the datafile and in the installed applications;

b. means for monitoring data entry devices for user input from a series of menus or icons associated with a CUI display window designed to select an invocable procedures associated with the LUAIP;

c. means for executing the selected LUAIP procedure to accomplish the user modification of one or more datafile entries and/or the information associated with one or more installed applications, thereby automatically synchronizing the directory and enrollment information in the central datafile and the installed applications; and     d. means for returning to the monitoring step (b) for further user input.

\* \* \* \* \*